United States Patent
Uenishi et al.

(10) Patent No.: US 11,008,445 B2
(45) Date of Patent: May 18, 2021

(54) AROMATIC VINYL-DIENE COPOLYMER, METHOD FOR PRODUCING AROMATIC VINYL-DIENE COPOLYMER, AND RUBBER COMPOSITION

(71) Applicant: THE YOKOHAMA RUBBER CO., LTD., Tokyo (JP)

(72) Inventors: Kazuya Uenishi, Hiratsuka (JP); Makoto Ashiura, Hiratsuka (JP); Motoji Fujita, Hiratsuka (JP); Naoya Amino, Hiratsuka (JP); Satoshi Mihara, Hiratsuka (JP); Yu Shinke, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 10 days.

(21) Appl. No.: 16/078,276

(22) PCT Filed: Feb. 10, 2017

(86) PCT No.: PCT/JP2017/004871
§ 371 (c)(1),
(2) Date: Aug. 21, 2018

(87) PCT Pub. No.: WO2017/145799
PCT Pub. Date: Aug. 31, 2017

(65) Prior Publication Data
US 2019/0023880 A1    Jan. 24, 2019

(30) Foreign Application Priority Data
Feb. 23, 2016  (JP) .............................. JP2016-032200
Dec. 8, 2016   (JP) .............................. JP2016-238341

(51) Int. Cl.
| | | |
|---|---|---|
| C08L 9/06 | (2006.01) | |
| C08F 236/10 | (2006.01) | |
| C08C 19/44 | (2006.01) | |
| C08K 3/013 | (2018.01) | |
| C08C 19/25 | (2006.01) | |
| C08C 19/22 | (2006.01) | |
| C08C 19/00 | (2006.01) | |
| C08K 3/16 | (2006.01) | |
| C08K 5/1515 | (2006.01) | |
| C08K 5/3412 | (2006.01) | |
| C08K 5/56 | (2006.01) | |
| C08K 3/04 | (2006.01) | |
| C08K 3/011 | (2018.01) | |
| C08K 5/00 | (2006.01) | |
| C08K 3/36 | (2006.01) | |
| B60C 1/00 | (2006.01) | |

(52) U.S. Cl.
CPC .............. *C08L 9/06* (2013.01); *C08C 19/00* (2013.01); *C08C 19/22* (2013.01); *C08C 19/25* (2013.01); *C08C 19/44* (2013.01); *C08F 236/10* (2013.01); *C08K 3/013* (2018.01); *C08K 3/16* (2013.01); *C08K 5/1515* (2013.01); *C08K 5/3412* (2013.01); *C08K 5/56* (2013.01); *B60C 1/0016* (2013.01); *C08K 3/011* (2018.01); *C08K 3/04* (2013.01); *C08K 3/36* (2013.01); *C08K 5/0025* (2013.01)

(58) Field of Classification Search
None
See application file for complete search history.

(56) References Cited

U.S. PATENT DOCUMENTS

| | | | |
|---|---|---|---|
| 6,103,842 A | 8/2000 | Halasa et al. | |
| 7,291,687 B1 * | 11/2007 | Halasa ................... | C08F 36/04 502/153 |
| 2003/0134999 A1 * | 7/2003 | Windisch ............... | C08F 36/04 526/188 |
| 2003/0153698 A1 | 8/2003 | Halasa et al. | |
| 2006/0149010 A1 | 7/2006 | Halasa et al. | |
| 2011/0319519 A1 * | 12/2011 | Sone ...................... | C08L 15/00 523/155 |
| 2012/0270997 A1 | 10/2012 | Tanaka et al. | |
| 2013/0289183 A1 | 10/2013 | Kerns et al. | |
| 2018/0051101 A1 * | 2/2018 | Adachi ................. | B60C 1/0016 |

FOREIGN PATENT DOCUMENTS

| | | |
|---|---|---|
| JP | S45-39272 B | 12/1970 |
| JP | S54-065788 A | 5/1979 |
| JP | H02-060907 A | 3/1990 |
| JP | 2712622 B2 | 2/1998 |
| JP | H10-306114 A | 11/1998 |
| JP | 2002-520457 A | 7/2002 |
| JP | 2006-188682 | 7/2006 |
| JP | 2009-263587 A | 11/2009 |
| JP | 2011-084634 A | 4/2011 |
| JP | 2011-111510 A | 6/2011 |

(Continued)

OTHER PUBLICATIONS

Office Action dated Nov. 6, 2018 to the corresponding Japanese Patent Application No. 2017-112365.

(Continued)

*Primary Examiner* — Robert T Butcher
(74) *Attorney, Agent, or Firm* — Carrier Blackman & Associates, P.C.; Joseph P. Carrier; Anne G. Sabourin

(57) ABSTRACT

The present invention is to provide an aromatic vinyl-diene copolymer which exhibits excellent mechanical properties and wear resistance when being formed into a tire, a method for producing the aromatic vinyl-diene copolymer, and a rubber composition containing the aromatic vinyl-diene copolymer. The aromatic vinyl-diene copolymer of an embodiment of the present invention is an aromatic vinyl-diene copolymer which is a copolymer of an aromatic vinyl and a diene, wherein the content of a repeating unit derived from an aromatic vinyl is 18 mass % or greater, among repeating units derived from a diene, a proportion of a vinyl structure is 8 mol % or less, a proportion of a 1,4-trans structure is 75 mol % or less, and a proportion of a 1,4-cis structure is from 17 to 90 mol %, and a glass transition temperature is −60° C. or lower.

14 Claims, 1 Drawing Sheet

(56) References Cited

FOREIGN PATENT DOCUMENTS

JP  2013-231177 A  11/2013
WO  2011/049180 A1  4/2011

OTHER PUBLICATIONS

Extended European search report dated Jul. 8, 2019 issued in the corresponding EP Patent Application 17756240.2.

* cited by examiner

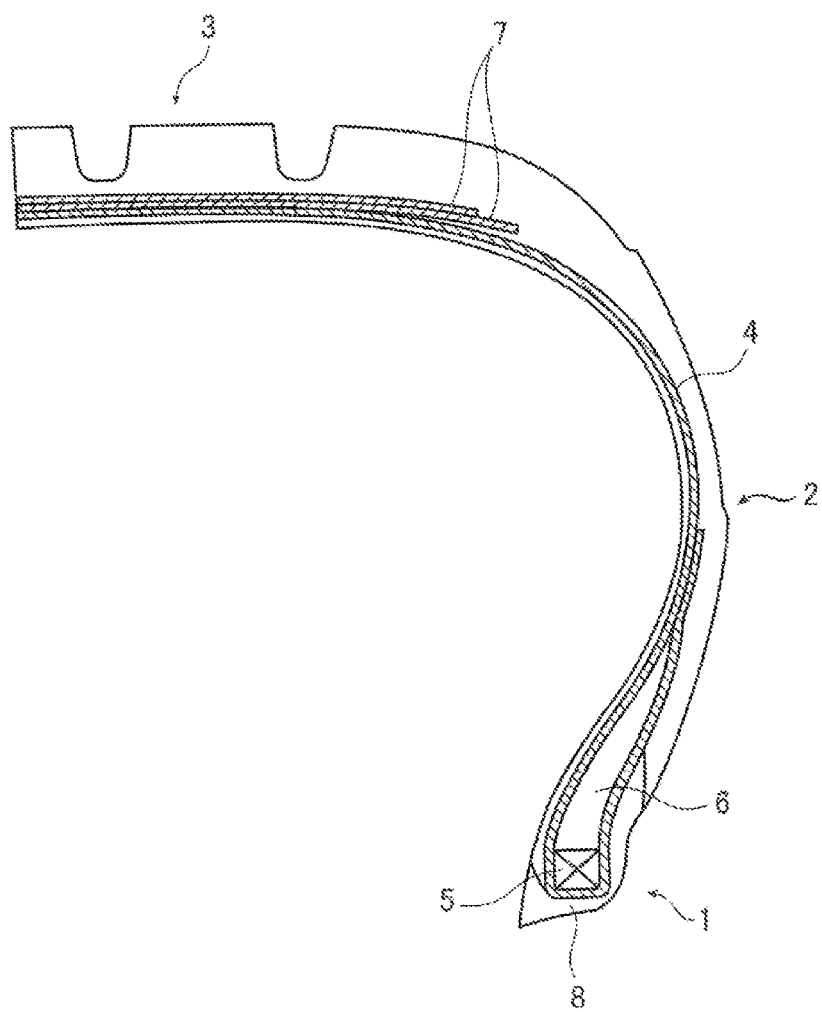

AROMATIC VINYL-DIENE COPOLYMER, METHOD FOR PRODUCING AROMATIC VINYL-DIENE COPOLYMER, AND RUBBER COMPOSITION

TECHNICAL FIELD

The present invention relates to an aromatic vinyl-diene copolymer, a method for producing an aromatic vinyl-diene copolymer, and a rubber composition.

BACKGROUND ART

As rubber materials used in tires and the like, diene polymers, such as butadiene homopolymers (BR) and styrene-butadiene copolymers (SBR) have been conventionally known.

Note that the diene polymers are produced mainly by emulsion polymerization or solution polymerization. For example, Patent Literature 1 discloses a method for producing a conjugated diene polymer in which a monomer formed from a conjugated diene or a conjugated diene and an aromatic vinyl compound is polymerized in an inert organic solvent by using a catalyst composition containing (a) a dialkoxy barium compound, (b) an organoaluminum compound, (c) an organolithium compound, (d) an amine compound represented by general formula (I) or a diamine compound represented by general formula (II), as a method for producing a diene (conjugated diene-based) polymer by solution polymerization.

CITATION LIST

Patent Literature

Patent Literature 1: JP 2712622 B

SUMMARY OF INVENTION

Technical Problem

In recent years, as demands for vehicle safety increase, further enhancement in mechanical properties (e.g. hardness and strength at break) and wear resistance of tires have been desired.

In such circumstances, when inventors of the present invention produced a tire by using a copolymer of an aromatic vinyl and a diene (e.g. SBR) in accordance with Patent Literature 1, it was found that the mechanical properties and the wear resistance thereof do not necessarily satisfy the levels required recently.

Therefore, in light of such circumstances, an object of the present invention is to provide an aromatic vinyl-diene copolymer which exhibits excellent mechanical properties and wear resistance when being formed into a tire, a method for producing the aromatic vinyl-diene copolymer, and a rubber composition containing the aromatic vinyl-diene copolymer.

Solution to Problem

As a result of diligent research on the problems described above, the inventors of the present invention found that the problems described above can be solved by setting the content of repeating units derived from an aromatic vinyl, proportions of microstructures (vinyl structure, 1,4-cis structure, and 1,4-trans structure) of repeating units derived from a diene, and the glass transition temperature to particular ranges, and thus completed the present invention.

Specifically, the inventors of the present invention found that the problems described above can be solved by the following features.

(1) An aromatic vinyl-diene copolymer which is a copolymer of an aromatic vinyl and a diene, wherein
a content of a repeating unit derived from an aromatic vinyl is 18 mass % or greater,
among repeating units derived from a diene, a proportion of a vinyl structure is 8 mol % or less, a proportion of a 1,4-trans structure is 75 mol % or less, and a proportion of a 1,4-cis structure is from 17 to 90 mol %, and
a glass transition temperature is −60° C. or lower.

(2) The aromatic vinyl-diene copolymer according to (1), wherein the proportion of the 1,4-cis structure is 30 mol % or greater.

(3) The aromatic vinyl-diene copolymer according to (1) or (2), wherein a terminal is modified with at least one type of modifying agent selected from the group consisting of titanium halides, tin halides, cyclic silazanes, alkoxysilanes, epoxides, amines, ketones, and compounds represented by formula (N) described below.

(4) A method for producing an aromatic vinyl-diene copolymer, wherein the aromatic vinyl-diene copolymer described in (1) or (2) is produced by copolymerizing a monomer containing an aromatic vinyl and a diene by using an initiator prepared by using an organolithium compound, an alkyl aluminum, and a metal alcoholate.

(5) The method for producing an aromatic vinyl-diene copolymer, wherein the aromatic vinyl-diene copolymer described in (3) is produced by
copolymerizing a monomer containing an aromatic vinyl and a diene by using an initiator prepared by using an organolithium compound, an alkyl aluminum, and a metal alcoholate, and then
terminating the polymerization by using an electrophile selected from the group consisting of titanium halides, tin halides, cyclic silazanes, alkoxysilanes, epoxides, amines, ketones, and compounds represented by formula (N) described below.

(6) The method for producing an aromatic vinyl-diene copolymer according to (4) or (5), wherein a phenol compound is added to a copolymer system during the copolymerization of the monomer.

(7) A rubber composition comprising the aromatic vinyl-diene copolymer according to any one of (1) to (3).

Advantageous Effects of Invention

As described below, according to the present invention, an aromatic vinyl-diene copolymer which exhibits excellent mechanical properties and wear resistance when being formed into a tire, a method for producing the aromatic vinyl-diene copolymer, and a rubber composition containing the aromatic vinyl-diene copolymer can be provided.

BRIEF DESCRIPTION OF DRAWINGS

The drawing is a partial cross-sectional schematic view of a tire that represents an embodiment of a tire in which the aromatic vinyl-diene copolymer according to an embodiment of the present invention is used.

DESCRIPTION OF EMBODIMENTS

Hereinafter, an aromatic vinyl-diene copolymer, a method for producing the aromatic vinyl-diene copolymer, and a rubber composition containing the aromatic vinyl-diene copolymer, and the like of the present invention are described.

Note that, in the present specification, numerical ranges indicated by using "(from) . . . to . . . " include the former number as the lower limit value and the later number as the upper limit value.

Aromatic Vinyl-Diene Copolymer

The aromatic vinyl-diene copolymer of an embodiment of the present invention (hereinafter, also referred to as "the copolymer of an embodiment of the present invention") is a copolymer of an aromatic vinyl and a diene. Note that the content of repeating units derived from the aromatic vinyl is 18 mass % or greater. Furthermore, the proportion of each of microstructures of repeating units derived from the diene is in a particular range. Specifically, among repeating units derived from the diene, a proportion of a vinyl structure is 8 mol % or less, a proportion of a 1,4-trans structure is 75 mol % or less, and a proportion of a 1,4-cis structure is from 17 to 60 mol %. Furthermore, the glass transition temperature is −60° C. or lower. The copolymer of an embodiment of the present invention is preferably a solution polymerized copolymer (especially, solution polymerized SBR) from the perspective of achieving superior effects of the present invention.

The copolymer of an embodiment of the present invention is described below in detail.

Monomer

The copolymer of an embodiment of the present invention is a copolymer of an aromatic vinyl and a diene. That is, the copolymer of an embodiment of the present invention is a copolymer obtained by copolymerizing an aromatic vinyl and a diene. The copolymer of an embodiment of the present invention may be a copolymer obtained by further copolymerizing another monomer in addition to the aromatic vinyl and the diene.

Aromatic Vinyl

The aromatic vinyl is not particularly limited, and examples thereof include styrene, α-methylstyrene, 2-methylstyrene, 3-methylstyrene, 4-methylstyrene, 2-ethylstyrene, 3-ethylstyrene, 4-ethylstyrene, 2,4-diisopropylstyrene, 2,4-dimethylstyrene, 4-t-butylstyrene, 5-t-butyl-2-methylstyrene, vinyl naphthalene, dimethylaminomethylstyrene, dimethylaminoethylstyrene, and the like. Among these, styrene, α-methylstyrene, and 4-methylstyrene are preferred, and styrene is more preferred, from the perspective of achieving superior effects of the present invention. A single aromatic vinyl may be used alone, or a combination of two or more types of aromatic vinyls may be used.

In a copolymer of an embodiment of the present invention, the content of the repeating units derived from the aromatic vinyl (hereinafter, also referred to as "aromatic vinyl content") is 18 mass % or greater. In particular, from the perspective of achieving superior effects of the present invention, the content is preferably 20 mass % or greater, and more preferably 30 mass % or greater. The upper limit is not particularly limited; however, from the perspective of achieving superior effects of the present invention, the upper limit is preferably 90 mass % or less, more preferably 70 mass % or less, and even more preferably 60 mass % or less.

Diene

The diene is not particularly limited, and examples thereof include conjugated dienes, such as butadiene (e.g. 1,3-butadiene), isoprene, and chloroprene. In particular, from the perspective of achieving superior effects of the present invention, the diene is preferably 1,3-butadiene or isoprene. A single diene may be used alone, or a combination of two or more types of dienes may be used.

In the copolymer of an embodiment of the present invention, the content of the repeating units derived from the diene is preferably 82 mass % or less, more preferably 80 mass % or less, and even more preferably 70 mass % or less, from the perspective of achieving superior effects of the present invention. Furthermore, the lower limit is preferably 10 mass % or greater, more preferably 30 mass % or greater, and even more preferably 40 mass % or greater, from the perspective of achieving superior effects of the present invention.

Other Monomer

As described above, the copolymer of an embodiment of the present invention may be a copolymer obtained by further copolymerizing another monomer in addition to the aromatic vinyl and the diene. Examples of such a monomer include α- and β-unsaturated nitriles, such as acrylonitrile and methacrylonitrile; unsaturated carboxylic acids or acid anhydrides, such as acrylic acid, methacrylic acid, and maleic anhydride; unsaturated carboxylic acid esters, such as methyl methacrylate, ethyl acrylate, and butyl acrylate; non-conjugated dienes, such as 1,5-hexadiene, 1,6-heptadiene, 1,7-octadiene, dicyclopentadiene, and 5-ethylidene-2-norbornene; and the like.

Microstructure

Vinyl Structure

In the copolymer of an embodiment of the present invention, among the repeating units derived from the diene, the proportion of the vinyl structure is 8 mol % or less. In particular, from the perspective of achieving superior effects of the present invention, the proportion is preferably 5 mol % or less. The lower limit is not particularly limited and is 0 mol %.

Note that the "proportion of a vinyl structure" refers to a proportion (mol %) occupied by repeating units having vinyl structures (e.g. 1,2-vinyl structure in the case where the diene is 1,3-butadiene) relative to the total amount of repeating units derived from a diene.

1,4-Trans Structure

In the copolymer of an embodiment of the present invention, among the repeating units derived from the diene, the proportion of the 1,4-trans structure is 75 mol % or less. In particular, the proportion is preferably 70 mol % or less, more preferably less than 70 mol %, and even more preferably 60 mol % or less, from the perspective of achieving superior effects of the present invention. The lower limit is not particularly limited; however, from the perspective of achieving superior effects of the present invention, the lower limit is preferably 10 mol % or greater, more preferably 20 mol % or greater, and even more preferably 30 mol % or greater.

Note that the "proportion of a 1,4-trans structure" refers to a proportion (mol %) occupied by repeating units having 1,4-trans structure relative to the total amount of repeating units derived from a diene.

1,4-Cis Structure

In the copolymer of an embodiment of the present invention, among the repeating units derived from the diene, the proportion of the 1,4-cis structure is from 17 to 90 mol %. In particular, the proportion is preferably from 20 to 55 mol %, more preferably from 25 to 85 mol %, even more preferably from 30 to 80 mol %, and particularly preferably from 40 to 75 mol %, from the perspective of achieving superior effects of the present invention.

Note that the "proportion of a 1,4-cis structure" refers to a proportion (mol %) occupied by repeating units having 1,4-cis structure relative to the total amount of repeating units derived from a diene.

Note that, hereinafter, among repeating units derived from a diene, "proportion of a vinyl structure (mol %), proportion of a 1,4-trans structure (mol %), proportion of a 1,4-cis structure (mol %)" is represented as "vinyl/trans/cis".

Glass Transition Temperature

The glass transition temperature (Tg) of the copolymer of an embodiment of the present invention is −60° C. or lower. In particular, from the perspective of achieving superior effects of the present invention, the glass transition temperature is preferably −70° C. or lower, and more preferably −80° C. or lower. The lower limit is not particularly limited; however, from the perspective of achieving superior effects of the present invention, the glass transition temperature is preferably −100° C. or higher, and more preferably −90° C. or higher.

Note that, in the present specification, the glass transition temperature (Tg) is measured by using a differential scanning calorimeter (DSC) at a temperature elevation speed of 20° C./min and calculated by the midpoint method.

Molecular Weight

The molecular weight of the copolymer of an embodiment of the present invention is not particularly limited, but in terms of the weight average molecular weight (Mw), is preferably from 1000 to 10000000, more preferably from 2000 to 5000000, and even more preferably from 3000 to 2000000, from the perspective of achieving superior effects of the present invention. Furthermore, from the perspective of achieving superior effects of the present invention, the number average molecular weight (Mn) is preferably from 500 to 5000000, more preferably from 1000 to 2500000, and even more preferably from 1500 to 1000000.

Note that, in the present specification, the number average molecular weight (Mn) and the weight average molecular weight (Mw) are values based on calibration with polystyrene standard obtained by gel permeation chromatography (GPC) measurement performed under the following conditions.

Solvent: Tetrahydrofuran
Detector: RI detector

Preferred Embodiment

Examples of preferred embodiments of the copolymer of an embodiment of the present invention include embodiments in which a terminal is modified with at least one type of modifying agent selected from the group consisting of titanium halides, tin halides, cyclic silazanes, alkoxysilanes, epoxides, amines, ketones, and compounds represented by formula (N) described below (hereinafter, also referred to as "particular modifying agent"). In the cases of embodiments described above, superior effects of the present invention are achieved.

Note that, when the particular modifying agent is a titanium halide, a tin halide, or a compound represented by formula (N) described below, it is presumed that the terminal of the copolymer of an embodiment of the present invention interacts with carbon black. When the particular modifying agent is a cyclic silazane, an alkoxysilane, or an amine, it is presumed that the terminal of the copolymer of an embodiment of the present invention interacts with silica. When the particular modifying agent is an epoxide or a ketone, it is presumed that the terminal of the copolymer of an embodiment of the present invention interacts with silica or carbon black.

From the perspective of achieving superior effects of the present invention, the particular modifying agent is preferably a cyclic silazane, an alkoxysilane, or a compound represented by formula (N) described below, and more preferably a cyclic silazane.

Particular Modifying Agent

The particular modifying agents are described below.

Titanium Halide

The titanium halide is not particularly limited, and examples thereof include $TiCl_3$, $TiBr_3$, $Ti(OC_2H_5)Cl_2$, $Ti(OC_4H_9)Cl_2$, $TiCl_4$, $Ti(OC_2H_5)Cl_3$, $Ti(OC_4H_9)Cl_3$, and the like. Among these, from the perspective of achieving superior effects of the present invention, $TiCl_3$ (titanium trichloride) and $TiCl_4$ (titanium tetrachloride) are preferable, and titanium tetrachloride is more preferable.

Tin Halide

The tin halide is not particularly limited, and examples thereof include tin fluoride, tin chloride, tin bromide, tin iodide, tin astatide, and the like.

Cyclic Silazane

The cyclic silazane is not particularly limited as long as it is a cyclic silazane.

Note that "silazane" means a compound having a structure in which a silicon atom and a nitrogen atom are directly bonded (compound having an Si—N bond).

From the perspective of achieving superior effects of the present invention, a cyclic silazane is preferably a compound represented by formula (S) below.

[Chemical Formula 1]

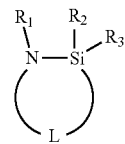

(S)

In formula (S) above, $R_1$ to $R_3$ each independently represent a hydrogen atom or a substituent. Specific examples of the substituent are the same as those described for R in formula (P) described below.

From the perspective of achieving superior effects of the present invention, $R_1$ is preferably an alkyl group (preferably having from 1 to 10 carbons), an alkylsilyl group (preferably having from 1 to 10 carbons), or an aromatic hydrocarbon group (preferably having from 6 to 18 carbons).

From the perspective of achieving superior effects of the present invention, $R_2$ is preferably an alkoxy group (preferably having from 1 to 10 carbons).

In formula (S) above, L represents a divalent organic group.

Examples of the divalent organic group include substituted or unsubstituted aliphatic hydrocarbon groups (e.g. alkylene group; preferably having from 1 to 8 carbons), substituted or unsubstituted aromatic hydrocarbon groups (e.g. arylene group; preferably having from 6 to 12 carbons), —O—, —S—, —$SO_2$—, —N(R)— (R: alkyl group), —CO—, —NH—, —COO—, —CONH—, or groups formed by combining these (e.g. alkyleneoxy groups (—$C_mH_{2m}O$—; m is a positive integer), alkyleneoxycarbonyl groups, alkylenecarbonyloxy groups, and the like), and the like.

From the perspective of achieving superior effects of the present invention, L is preferably an alkylene group (preferably having from 1 to 10 carbons).

Examples of the compound represented by formula (S) above include N-n-butyl-1,1-dimethoxy-2-azasilacyclopentane, N-phenyl-1,1-dimethoxy-2-azasilacyclopentane, N-trimethylsilyl-1,1-dimethoxy-2-azasilacyclopentane, N-trimethylsilyl-1,1-diethoxy-2-azasilacyclopentane, and the like.

Note that it is conceived that the silicon atom of the cyclic silazane exhibits electrophilicity.

Alkoxysilane

The alkoxysilane is not particularly limited as long as the alkoxysilane is a compound having an alkoxysilyl group, and examples thereof include tetramethoxysilane, methyltrimethoxysilane, dimethyldimethoxysilane, tetraethoxysilane, methyltriethoxysilane, dimethyldiethoxysilane, phenyltrimethoxysilane, diphenyldimethoxysilane, phenyltriethoxysilane, diphenyldiethoxysilane, hexyltrimethoxysilane, hexyltriethoxysilane, 3-glycidoxypropyltrimethoxysilane, 3-glycidoxypropyltriethoxysilane, 3-glycidoxypropylmethyldimethoxysilane, N,N-bistrimethylsilyl-3-aminopropyltrimethoxysilane, N,N-bistrimethylsilyl-3-aminopropyltriethoxysilane, and the like.

The number of the alkoxy groups in the alkoxysilyl group is not particularly limited; however, from the perspective of achieving superior effects of the present invention, the number is preferably 2 or greater.

Note that it is conceived that the silicon atom of the alkoxysilane exhibits electrophilicity.

Epoxide

The epoxide is not particularly limited as long as the epoxide is a compound having an oxacyclopropane (oxirane) structure.

Specific examples of the epoxide include ethylene oxide, propylene oxide, butylene oxide, cyclohexene oxide, styrene oxide, 1-phenylpropylene oxide, methyl glycidyl ether, ethyl glycidyl ether, glycidyl isopropyl ether, butyl glycidyl ether, 1-methoxy-2-methylpropylene oxide, allyl glycidyl ether, 2-ethyloxyl glycidyl ether, phenyl glycidyl ether, p-tert-butylphenyl glycidyl ether, lauryl alcohol glycidyl ether, stearyl glycidyl ether, palmityl glycidyl ether, myristyl glycidyl ether, lauryl glycidyl ether, capryl glycidyl ether, caproyl glycidyl ether, and the like.

Amine

The amine is not particularly limited as long as the amine is a compound having an amino group (—$NR_2$: R represents a hydrogen atom or a hydrocarbon group; the two R moieties may be the same or different). In particular, from the perspective of achieving superior effects of the present invention, the amine is preferably aziridine. Examples of the aziridine include N-methylaziridine, N-ethylaziridine, N-isopropylaziridine, N-phenylaziridine, N-(4-methylphenyl)aziridine, N-methyl-2-methylaziridine, and the like.

Ketone

The ketone is not particularly limited as long as the ketone is a compound having a ketone group (—CO—).

Specific examples of the ketone include acetone, benzophenone, derivatives of these, and the like.

Examples of the derivatives of benzophenone include N,N,N',N'-tetramethyl-4,4'-diaminobenzophenone, N,N,N',N'-tetraethyl(4,4'-diamino)-benzophenone, N,N-dimethyl-1-aminobenzoquinone, N,N,N',N'-tetramethyl-1,3-diaminobenzoquinone, N,N-dimethyl-1-aminoanthraquinone, N,N,N',N'-tetramethyl-1,4-diaminoanthraquinone, 4,4'-diacetylbenzophenone, and the like.

Compound Represented by Formula (N)

The compound represented by formula (N) below is described below.

[Chemical Formula 2]

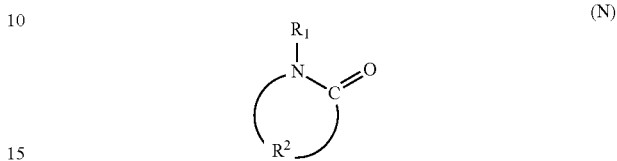

In formula (N) above, $R^1$ represents a hydrogen atom or an alkyl group (preferably having from 1 to 10 carbons), and $R^2$ represents an alkylene group (preferably having from 2 to 10 carbons).

Specific examples of the compound represented by formula (N) above include N-methylpyrrolidone (in formula (N) above, $R_1$ is a methyl group, and $R_2$ is a propylene group) and the like.

Use

The copolymer of an embodiment of the present invention can be widely used in rubber products, such as tires, conveyor belts, and hoses, because the copolymer exhibits excellent mechanical properties and wear resistance. Among these, use in tires is particularly preferred.

Method for Producing Aromatic Vinyl-Diene Copolymer

The method for producing the copolymer of an embodiment of the present invention described above is not particularly limited, and a conventionally known method can be used. The methods of setting the aromatic vinyl content, the proportions of microstructures, and the glass transition temperature to particular ranges are not particularly limited; however, for example, the aromatic vinyl content, the proportions of microstructures, and the glass transition temperature can be adjusted to particular ranges by adjusting the types of monomers to be polymerized, the quantitative ratio of monomer, the type of initiator, the quantitative ratio of initiator, the reaction temperature, and the like.

Preferred Embodiment

Examples of a preferred embodiment of the method for producing the copolymer of an embodiment of the present invention include a method of copolymerizing a monomer containing an aromatic vinyl and a diene by using an initiator prepared by using an organolithium compound, an alkyl aluminum, and a metal alcoholate (hereinafter, also referred to as "particular initiator") (hereinafter, also referred to as "method of an embodiment of the present invention"). When the method described above is used, the obtained aromatic vinyl-diene copolymer exhibits superior mechanical properties and wear resistance when a tire is formed.

Particular Initiator

As described above, in the method of an embodiment of the present invention, an initiator prepared by using an organolithium compound, an alkyl aluminum, and a metal alcoholate (particular initiator) is used. It is conceived that, because the particular initiator is used in the method of an embodiment of the present invention, the proportion occupied by the vinyl structure among repeating units derived from the diene can be suppressed (e.g. 8 mol % or less) in the obtained aromatic vinyl-diene copolymer.

From the perspective of achieving superior effects of the present invention, the particular initiator is preferably an initiator in which an aromatic divinyl is used. That is, an initiator prepared by using an organolithium compound, an alkyl aluminum, a metal alcoholate, and an aromatic divinyl is preferable. By using the aromatic divinyl, the obtained copolymer is branched, the molecular weight is increased, and mechanical properties and wear resistance are further enhanced when a tire is formed.

Organolithium Compound

Examples of the organolithium compound include monoorganolithium compounds, such as n-butyllithium, sec-butyllithium, tert-butyllithium, n-propyllithium, iso-propyllithium, and benzyllithium; and polyfunctional organolithium compounds, such as 1,4-dilithiobutane, 1,5-dilithiopentane, 1,6-dilithiohexane, 1,10-dilithiodecane, 1,1-dilithiodiphenylene, dilithiopolybutadiene, dilithiopolyisoprene, 1,4-dilithiobenzene, 1,2-dilithio-1,2-diphenylethane, 1,4-dilithio-2-ethylcyclohexane, 1,3,5-trilithiobenzene, and 1,3,5-trilithio-2,4,6-triethylbenzene. In particular, from the perspective of achieving superior effects of the present invention, a monoorganolithium compound, such as n-butyllithium, sec-butyllithium, or tert-butyllithium, is preferable.

The amount of the organolithium compound used in the preparation of the particular initiator is not particularly limited but is preferably from 0.001 to 10 mol % relative to the amount of the monomers to be polymerized from the perspective of achieving superior effects of the present invention.

Alkyl Aluminum

The alkyl aluminum is not particularly limited as long as the alkyl aluminum is a compound in which an alkyl group (open-chain, branched, cyclic) is bonded to an aluminum atom (Al). The number of carbons of the alkyl group is not particularly limited but is preferably from 1 to 20, and more preferably from 1 to 10, from the perspective of achieving superior effects of the present invention. Specific examples of the alkyl aluminum include trimethylaluminum, triethylaluminum, triisopropylaluminum, tributylaluminum, triisobutylaluminum, tripropylaluminum, tributylaluminum, triisobutylaluminum, pentyldiethylaluminum, 2-methylpentyl-diethylaluminum, dicyclohexylethylaluminum, tripentylaluminum, trihexylaluminum, trioctylaluminum, tri(2-ethylhexyl)aluminum, tricyclohexylaluminum, tricyclopentylaluminum, tri(2,2,4-trimethylpentyl)aluminum, tridodecylaluminum, tri(2-methylpentyl)aluminum, diisobutylaluminum hydride, diethylaluminum hydride, dipropylaluminum hydride, propylaluminum dihydride, isobutylaluminum dihydride, and the like. Among these, trioctylaluminum is preferable from the perspective of achieving superior effects of the present invention.

The proportion of the alkyl aluminum relative to the amount of the organolithium compound used in the preparation of the particular initiator is not particularly limited but is preferably from 0.1 to 50 molar equivalents, and more preferably from 0.5 to 10 molar equivalents, from the perspective of achieving superior effects of the present invention. Note that "1 molar equivalent" indicates an amount required to add 1 mol of an alkyl aluminum when 1 mol of an organolithium compound is used. That is, the proportion of the alkyl aluminum relative to the amount of the organolithium compound used in the preparation of the particular initiator is not particularly limited but is preferably from 10 to 5000 mol %, and more preferably from 50 to 1000 mol %, from the perspective of achieving superior effects of the present invention.

Metal Alcoholate

The metal alcoholate (metal alkoxide) is not particularly limited as long as the metal alcoholate is a compound in which hydrogen of a hydroxy group of an alcohol has been substituted with a metal.

The metal is not particularly limited, and examples thereof include alkali metals, alkaline earth metals, transition metals (metals of groups 3 to 11), aluminum, germanium, tin, antimony, and the like. In particular, from the perspective of achieving superior effects of the present invention, an alkaline earth metal is preferable, and barium is more preferable.

The alcohol is not particularly limited as long as the alcohol is a compound in which a hydrogen atom of an open-chain, branched, or cyclic hydrocarbon has been substituted with a hydroxy group. The number of carbons of the alcohol is not particularly limited but is preferably from 1 to 30, and more preferably from 1 to 20, from the perspective of achieving superior effects of the present invention.

From the perspective of achieving superior effects of the present invention, a metal alcoholate is preferably a barium alcoholate (barium alkoxide). Examples of the barium alkoxide include barium dimethoxide, barium diethoxide, barium dipropoxide, barium dibutoxide, barium bis(2-ethylhexoxide), and the like.

The proportion of the metal alcoholate relative to the amount of the organolithium compound used in the preparation of the particular initiator is not particularly limited but is preferably from 0.01 to 5 molar equivalents, and more preferably from 0.1 to 3 molar equivalents, from the perspective of achieving superior effects of the present invention. Note that "1 molar equivalent" indicates an amount required to add 1 mol of a metal alcoholate when 1 mol of an organolithium compound is used. That is, the proportion of the metal alcoholate relative to the amount of the organolithium compound used in the preparation of the particular initiator is not particularly limited but is preferably from 1 to 500 mol %, and more preferably from 10 to 300 mol %, from the perspective of achieving superior effects of the present invention.

Aromatic Divinyl

The aromatic divinyl is not particularly limited as long as the aromatic divinyl is an aromatic compound having two vinyl groups. In particular, from the perspective of achieving superior effects of the present invention, divinylbenzene is preferable.

The proportion of the aromatic divinyl relative to the amount of the organolithium compound used in the preparation of the particular initiator is not particularly limited but is preferably from 0.1 to 5 molar equivalents, and more preferably from 0.3 to 3 molar equivalents, from the perspective of achieving superior effects of the present invention. Note that "1 molar equivalent" indicates an amount required to add 1 mol of an aromatic divinyl when 1 mol of an organolithium compound is used. That is, the proportion of the aromatic divinyl relative to the amount of the organolithium compound used in the preparation of the particular initiator is not particularly limited but is preferably from 10 to 500 mol %, and more preferably from 30 to 300 mol %, from the perspective of achieving superior effects of the present invention.

Preparation Method of Particular Initiator

The preparation method of the particular initiator is not particularly limited, and examples thereof include a method in which the organolithium compound, the alkyl aluminum, the metal alcoholate described above, and the like are dissolved in a solvent; and the like.

The type of the solvent is not particularly limited and, for example, an organic solvent or the like can be used; however, from the perspective of achieving superior effects of the present invention, the solvent is preferably not an alcohol.

Monomer

The monomer (mixture) contains an aromatic vinyl and a diene. Specific examples and preferred forms of the aromatic vinyl and the diene are as described above.

The proportion of the aromatic vinyl in the monomer is not particularly limited; however, from the perspective of achieving superior effects of the present invention, the proportion is preferably 18 mass % or greater, more preferably 20 mass % or greater, and even more preferably 30 mass % or greater. The upper limit is not particularly limited; however, from the perspective of achieving superior effects of the present invention, the upper limit is preferably 90 mass % or less, more preferably 70 mass % or less, and even more preferably 60 mass % or less.

Furthermore, the proportion of the diene in the monomer is not particularly limited; however, from the perspective of achieving superior effects of the present invention, the proportion is preferably 82 mass % or less, more preferably 80 mass % or less, and even more preferably 70 mass % or less. Furthermore, the lower limit is preferably 10 mass % or greater, more preferably 30 mass % or greater, and even more preferably 40 mass % or greater, from the perspective of achieving superior effects of the present invention.

The monomer may further contain another monomer besides the aromatic vinyl and the diene. Specific examples of such a monomer are the same as those described for "Other monomer" described above.

Copolymerization of Monomer

As described above, in the method of an embodiment of the present invention, the monomers containing the aromatic vinyl and the diene are copolymerized by using the particular initiator. The particular initiator and the monomers are as described above.

The copolymerization method of the monomers is not particularly limited, and examples thereof include a method in which the monomers described above are added to an organic solvent solution containing the particular initiator described above, and the mixture is then agitated in a temperature range of 0 to 120° C. (preferably from 30 to 100° C.), and the like.

The proportion of the organolithium compound in the particular initiator relative to the amount of the monomers is not particularly limited but is preferably from 0.001 to 10 mol % from the perspective of achieving superior effects of the present invention.

When the monomers are copolymerized, a phenol compound and/or an amine compound may be added to the copolymer system (e.g. an organic solvent solution containing the particular initiator described above). In particular, from the perspective of achieving superior effects of the present invention, the phenol compound is preferable. When the phenol compound is added, the proportion of the 1,4-cis structure among the repeating units derived from the diene increases in the obtained aromatic vinyl-diene copolymer.

Note that the phenol compound indicates a compound having a phenolic hydroxy group or a metal salt thereof. Furthermore, the amine compound indicates a compound having an amino group (—$NH_2$, —NHR, —$NR_2$). Note that R represents a substituent. Specific examples and preferred forms of the substituent are the same as those described for R in formula (P) described below. Note that the two R moieties of —$NR_2$ may be the same or different.

Examples of the phenol compound include compounds represented by formula (P) below.

[Chemical Formula 3]

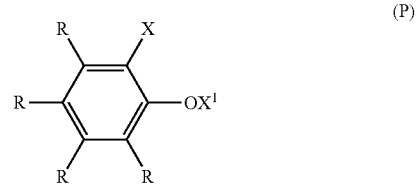

In formula (P) above, $X^1$ represents a hydrogen atom or a metal atom. Examples of the metal atom include a sodium atom, a potassium atom, and the like.

In formula (P) above, R represents a hydrogen atom or a substituent. A plurality of R moieties may be the same or different each other.

The substituent is not particularly limited as long as the substituent is a monovalent substituent. Examples thereof include hydrocarbon groups that may have a halogen atom, a hydroxy group, a nitro group, a carboxy group, an alkoxy group, an amino group, a mercapto group, an acyl group, an imide group, a phosphino group, a phosphinyl group, a silyl group, or a hetero atom, and the like.

Examples of the halogen atom include a fluorine atom, a chlorine atom, a bromine atom, an iodine atom, and the like.

Examples of the hetero atom of the hydrocarbon group that may have a hetero atom include an oxygen atom, a nitrogen atom, a sulfur atom, a phosphorous atom, and the like.

Examples of the hydrocarbon group that may have a hetero atom include aliphatic hydrocarbon groups, aromatic hydrocarbon groups, groups that have a combination of these, and the like.

The aliphatic hydrocarbon group may be in a form of straight-chain, branched-chain, or ring. Specific examples of the aliphatic hydrocarbon group include straight-chain or branched alkyl groups (especially, those having from 1 to 30 carbons), straight-chain or branched alkenyl groups (especially, those having from 2 to 30 carbons), straight-chain or branched alkynyl groups (especially, those having from 2 to 30 carbons), and the like.

Examples of the aromatic hydrocarbon group include aromatic hydrocarbon groups having from 6 to 18 carbons, such as a phenyl group, a tolyl group, a xylyl group, and a naphthyl group, and the like.

In formula (P) above, X represents a hydrogen atom, an —$OX^1$ group, or a substituent. $X^1$ is as described above. Furthermore, specific examples of the substituent are the same as those described for R in formula (P) described above.

The amount of the phenol compound to be added is not particularly limited but is preferably from 0.01 to 90 mol %, and more preferably from 0.1 to 80 mol %, relative to the amount of the organolithium compound from the perspective of achieving superior effects of the present invention.

The method of terminating the polymerization is not particularly limited, and examples thereof include a method in which an alcohol (especially, methanol) is added to the polymerization solution, and the like.

As the method of terminating the polymerization, from the perspective of achieving superior effects of the present invention, a method, in which the polymerization is terminated by using an electrophile selected from the group consisting of titanium halides, tin halides, cyclic silazanes, alkoxysilanes, epoxides, amines, ketones, and compounds represented by formula (N) described below (hereinafter, also referred to as "particular electrophile"), is preferred.

That is, the method of an embodiment of the present invention is preferably a method in which the monomers containing the aromatic vinyl and the diene are copolymerized by using the particular initiator, and then the polymerization is terminated by using the particular electrophile.

The definition, specific examples, and preferred forms of the particular electrophile are the same as those described for the particular modifying agent described above.

By terminating the polymerization by using the particular electrophile, a copolymer having a terminal modified with the particular electrophile (the particular modifying agent) can be obtained.

The amount of the particular electrophile relative to the amount of the particular initiator is not particularly limited but is preferably from 0.1 to 10, and more preferably from 1 to 5, in terms of the molar ratio of the electrophile to the organolithium compound (particular electrophile/organolithium compound) from the perspective of achieving superior effects of the present invention.

From the perspective of achieving superior effects of the present invention, the proportion of the particular electrophile relative to the alkyl aluminum (alkyl Al) in terms of the molar ratio (particular electrophile/alkyl Al) is preferably from 0.1 to 10, and more preferably from 1 to 5.

From the perspective of achieving superior effects of the present invention, the proportion of the electrophile relative to the amount of the metal alcoholate (electrophile/metal alcoholate) in terms of the molar ratio is preferably from 0.1 to 20, and more preferably from 1 to 10.

Rubber Composition

The rubber composition of an embodiment of the present invention (hereinafter, also referred to as "composition of an embodiment of the present invention") contains the polymer of an embodiment of the present invention described above.

The rubber composition may contain a component besides the polymer of an embodiment of the present invention. Examples of such a component include various additives typically used in rubber compositions, such as silica, carbon black, silane coupling agents, zinc oxide (zinc white), stearic acid, resins for adhesion, peptizing agents, anti-aging agents, waxes, processing aids, aroma oils, liquid polymers, terpene-based resins, thermosetting resins, vulcanizing agents (e.g. sulfur), and vulcanization accelerators.

Furthermore, the rubber composition may contain a rubber component besides the polymer of an embodiment of the present invention. Examples of such a rubber component include a natural rubber (NR), isoprene rubber (IR), butadiene rubber (BR), styrene-butadiene rubber (SBR) except the polymer of the present invention, acrylonitrile-butadiene copolymer rubber (NBR), butyl rubber (IIR), halogenated butyl rubber (Br-IIR, Cl-IIR), chloroprene rubber (CR), and the like.

Tire

The tire of an embodiment of the present invention is a tire produced by using the copolymer of an embodiment of the present invention described above. In particular, the tire is preferably a tire produced by using the composition of an embodiment of the present invention described above.

FIG. 1 is a partial cross-sectional schematic view of a tire that represents an embodiment of the tire of the present invention, but the tire of the present invention is not limited to the embodiment illustrated in FIG. 1.

In FIG. 1, reference numeral 1 denotes a bead portion, reference numeral 2 denotes a sidewall portion, and reference numeral 3 denotes a tire tread portion.

In addition, a carcass layer 4, in which a fiber cord is embedded, is mounted between a left-right pair of bead portions 1, and ends of the carcass layer 4 are wound by being folded around bead cores 5 and a bead filler 6 from an inner side to an outer side of the tire.

In the tire tread portion 3, a belt layer 7 is provided along the entire circumference of the tire on the outer side of the carcass layer 4.

Furthermore, the rim cushions 8 are provided in portions of the bead portions 1 that are in contact with a rim.

The tire of an embodiment of the present invention can be produced, for example, in accordance with a known method. In addition to ordinary air or air with an adjusted oxygen partial pressure, inert gases such as nitrogen, argon, and helium can be used as the gas with which the tire is filled.

EXAMPLES

The present invention will now be described in more detail with reference to Examples. However, the present invention is not limited to these Examples.

Production of Aromatic Vinyl-Diene Copolymer

Example 1: Copolymer 1 (SBR)

To a cyclohexane (4.24 kg) solution of a mixture of 1,3-butadiene (696 g, 12867 mmol), styrene (available from Kanto Chemical Co., Inc.; 300 g, 2883 mmol), and 4-tert-butylpyrocatechol (4.79 g, 28.8 mmol), 60 mL of an initiator solution (corresponding to the particular initiator described above) prepared by using n-BuLi (available from Kanto Chemical Co., Inc.; 1.60 mol/L (hexane solution), 18 mL, 28.8 mmol), barium bis(2-ethylhexoxide) (Ba(OCH$_2$CH(C$_2$H$_5$)CH$_2$CH$_2$CH$_2$CH$_3$)$_2$) (available from STREM; 1 M (toluene/hexane solution) 7.5 mL), trioctylaluminum (available from Aldrich; 25 wt % (hexane solution), 45 mL), and cyclohexane (available from Kanto Chemical Co., Inc.; 10 mL) was added and agitated at 60° C. for 14 hours. After the mixture was cooled to room temperature, methanol (available from Kanto Chemical Co., Inc.; 3.44 g) was added to the mixture to terminate the polymerization. The obtained solution was taken out and condensed under reduced pressure. The condensed solution was poured into methanol (5 L) to separate the component that was insoluble in the methanol. As a result, the styrene-butadiene copolymer (SBR) (876 g; Mn=166000; Mw=295000; PDI (polydispersity: Mw/Mn)=1.8) was obtained, and the yield was 88%. Note that, as a result of determination by IR spectroscopy, it was estimated that vinyl/trans/cis=3/61/36. Furthermore, the aromatic vinyl content (content of repeating units derived from styrene) was 31 mass %, and the glass transition temperature was −84° C.

Example 2: Copolymer 2 (SBR)

To a cyclohexane (4.24 kg) solution of a mixture of 1,3-butadiene (708 g, 13098 mmol), styrene (available from Kanto Chemical Co., Inc.; 300 g, 2883 mmol), and 4-tert-butylpyrocatechol (4.79 g, 28.8 mmol), 60 mL of an initiator solution (corresponding to the particular initiator described above) prepared by using n-BuLi (available from Kanto Chemical Co., Inc.; 1.60 mol/L (hexane solution), 18 mL, 28.8 mmol), divinylbenzene (available from Wako Pure Chemical Industries, Ltd.; 1.24 g; 9.54 mmol), barium bis(2-ethylhexoxide) ($Ba(OCH_2CH(C_2H_5)CH_2CH_2CH_2CH_3)_2$) (available from STREM; 1 M (toluene/hexane solution) 7.5 mL), trioctylaluminum (available from Aldrich; 25 wt % (hexane solution), 45 mL), and cyclohexane (available from Kanto Chemical Co., Inc.; 10 mL) was added and agitated at 60° C. for 14 hours. After the mixture was cooled to room temperature, methanol (available from Kanto Chemical Co., Inc.; 3.44 g) was added to the mixture to terminate the polymerization. The obtained solution was taken out and condensed under reduced pressure. The condensed solution was poured into methanol (5 L) to separate the component that was insoluble in the methanol. As a result, the styrene-butadiene copolymer (SBR) (761 g; Mn=350000; Mw=490000; PDI=1.4) was obtained, and the yield was 75%. Note that, as a result of determination by IR spectroscopy, it was estimated that vinyl/trans/cis=4/61/35. Furthermore, the aromatic vinyl content (content of repeating units derived from styrene) was 26 mass %, and the glass transition temperature was −84.5° C.

Example 3: Copolymer 3 (SBR)

To a cyclohexane (4.24 kg) solution of a mixture of 1,3-butadiene (708 g, 13098 mmol), styrene (available from Kanto Chemical Co., Inc.; 300 g, 2883 mmol), and 4-tert-butylpyrocatechol (4.79 g, 28.8 mmol), 60 mL of an initiator solution (corresponding to the particular initiator described above) prepared by using n-BuLi (available from Kanto Chemical Co., Inc.; 1.60 mol/L (hexane solution), 18 mL, 28.8 mmol), barium bis(2-ethylhexoxide) ($Ba(OCH_2CH(C_2H_5)CH_2CH_2CH_2CH_3)_2$) (available from STREM; 1 M (toluene/hexane solution) 7.5 mL), trioctylaluminum (available from Aldrich; 25 wt % (hexane solution), 45 mL), and cyclohexane (available from Kanto Chemical Co., Inc.; 10 mL) was added and agitated at 60° C. for 14 hours. After the mixture was cooled to room temperature, methanol (available from Kanto Chemical Co., Inc.; 3.44 g) was added to the mixture to terminate the polymerization. The obtained solution was taken out and condensed under reduced pressure. The condensed solution was poured into methanol (5 L) to separate the component that was insoluble in the methanol. As a result, the styrene-butadiene copolymer (SBR) (895 g; Mn=360000; Mw=500000; PDI=1.4) was obtained, and the yield was 88%. Note that, as a result of determination by IR spectroscopy, it was estimated that vinyl/trans/cis=3/62/35. Furthermore, the aromatic vinyl content (content of repeating units derived from styrene) was 31 mass %, and the glass transition temperature was −84° C.

Example 4: Copolymer 4 (Cyclic Silazane Terminal-Modified SBR)

To a cyclohexane (4.24 kg) solution of a mixture of 1,3-butadiene (708 g, 13098 mmol), styrene (available from Kanto Chemical Co., Inc.; 300 g, 2883 mmol), and 4-tert-butylpyrocatechol (4.79 g, 28.8 mmol), 60 mL of an initiator solution (corresponding to the particular initiator described above) prepared by using n-BuLi (available from Kanto Chemical Co., Inc.; 1.60 mol/L (hexane solution), 18 mL, 28.8 mmol), barium bis(2-ethylhexoxide) ($Ba(OCH_2CH(C_2H_5)CH_2CH_2CH_2CH_3)_2$) (available from STREM; 1 M (toluene/hexane solution) 7.5 mL), trioctylaluminum (available from Aldrich; 25 wt % (hexane solution), 45 mL), and cyclohexane (available from Kanto Chemical Co., Inc.; 10 mL) was added and agitated at 60° C. for 14 hours. After the mixture was cooled to room temperature, a cyclohexane (10 mL) mixed solution of N-trimethylsilyl-1,1-dimethoxy-2-azasilacyclopentane (15.5 g) and lithium diisopropylamide (available from Aldrich (2 M solution); 10 mL) was added to the mixture to terminate the polymerization. The obtained solution was taken out and condensed under reduced pressure. The condensed solution was poured into methanol (5 L) to separate the component that was insoluble in the methanol. As a result, the styrene-butadiene copolymer in which the terminal was modified with a cyclic silazane (cyclic silazane terminal-modified SBR) (920 g; Mn=420000; Mw=670000; PDI=1.60) was obtained, and the yield was 91%. Note that, as a result of determination by IR spectroscopy, it was estimated that vinyl/trans/cis=4/65/31. Furthermore, the aromatic vinyl content (content of repeating units derived from styrene) was 29 mass %, and the glass transition temperature was −85° C.

Example 5: Copolymer 5 (Titanium Halide Terminal-Modified SBR)

To a cyclohexane (4.24 kg) solution of a mixture of 1,3-butadiene (708 g, 13098 mmol), styrene (available from Kanto Chemical Co., Inc.; 300 g, 2883 mmol), and 4-tert-butylpyrocatechol (4.79 g, 28.8 mmol), 60 mL of an initiator solution (corresponding to the particular initiator described above) prepared by using n-BuLi (available from Kanto Chemical Co., Inc.; 1.60 mol/L (hexane solution), 18 mL, 28.8 mmol), barium bis(2-ethylhexoxide) ($Ba(OCH_2CH(C_2H_5)CH_2CH_2CH_2CH_3)_2$) (available from STREM; 1 M (toluene/hexane solution) 7.5 mL), trioctylaluminum (available from Aldrich; 25 wt % (hexane solution), 45 mL), and cyclohexane (available from Kanto Chemical Co., Inc.; 10 mL) was added and agitated at 60° C. for 14 hours. After the mixture was cooled to room temperature, titanium tetrachloride (available from Aldrich; 14.0 g) was added to the mixture to terminate the polymerization. The obtained solution was taken out and condensed under reduced pressure. The condensed solution was poured into methanol (5 L) to separate the component that was insoluble in the methanol. As a result, the styrene-butadiene copolymer in which the terminal was modified with a titanium halide (titanium halide terminal-modified SBR) (860 g; Mn=244000; Mw=610000; PDI=2.50) was obtained, and the yield was 85%. Note that, as a result of determination by IR spectroscopy, it was estimated that vinyl/trans/cis=2/47/51. Furthermore, the aromatic vinyl content (content of repeating units derived from styrene) was 31 mass %, and the glass transition temperature was −85° C.

Example 6: Copolymer 6 (Tin Halide Terminal-Modified SBR)

To a cyclohexane (4.24 kg) solution of a mixture of 1,3-butadiene (708 g, 13098 mmol), styrene (available from Kanto Chemical Co., Inc.; 300 g, 2883 mmol), and 4-tert-butylpyrocatechol (4.79 g, 28.8 mmol), 60 mL of an initiator solution (corresponding to the particular initiator described above) prepared by using n-BuLi (available from Kanto Chemical Co., Inc.; 1.60 mol/L (hexane solution), 18 mL, 28.8 mmol), barium bis(2-ethylhexoxide) ($Ba(OCH_2CH(C_2H_5)CH_2CH_2CH_2CH_3)_2$) (available from STREM; 1 M (toluene/hexane solution) 7.5 mL), trioctylaluminum (available from Aldrich; 25 wt % (hexane solution), 45 mL), and cyclohexane (available from Kanto Chemical Co., Inc.; 10 mL) was added and agitated at 60° C. for 14 hours. After the mixture was cooled to room temperature, tin chloride (SnCl$_4$) (available from Kanto Chemical Co., Inc.; 18.7 g) was added to the mixture to terminate the polymerization. The obtained solution was taken out and condensed under reduced pressure. The condensed solution was poured into methanol (5 L) to separate the component that was insoluble in the methanol. As a result, the styrene-butadiene copolymer in which the terminal was modified with a tin halide (tin halide terminal-modified SBR) (878 g; Mn=227000; Mw=658000; PDI=2.90) was obtained, and the yield was 87%. Note that, as a result of determination by IR spectroscopy, it was estimated that vinyl/trans/cis=4/58/38. Furthermore, the aromatic vinyl content (content of repeating units derived from styrene) was 28 mass %, and the glass transition temperature was −84° C.

Example 7: Copolymer 7 (Alkoxysilane Terminal-Modified SBR)

To a cyclohexane (4.24 kg) solution of a mixture of 1,3-butadiene (721 g, 13330 mmol), styrene (available from Kanto Chemical Co., Inc.; 300 g, 2883 mmol), and 4-tert-butylpyrocatechol (4.79 g, 28.8 mmol), 60 mL of an initiator solution (corresponding to the particular initiator described above) prepared by using n-BuLi (available from Kanto Chemical Co., Inc.; 1.60 mol/L (hexane solution), 18 mL, 28.8 mmol), barium bis(2-ethylhexoxide) (Ba(OCH$_2$CH(C$_2$H$_5$)CH$_2$CH$_2$CH$_2$CH$_3$)$_2$) (available from STREM; 1 M (toluene/hexane solution) 7.5 mL), trioctylaluminum (available from Aldrich; 25 wt % (hexane solution), 45 mL), and cyclohexane (available from Kanto Chemical Co., Inc.; 10 mL) was added and agitated at 60° C. for 14 hours. After the mixture was cooled to room temperature, a cyclohexane (10 mL) mixed solution of N,N-bistrimethylsilyl-3-aminopropyltrimethoxysilane (22.4 g) and lithium diisopropylamide (available from Aldrich (2 M solution); 10 mL) was added to the mixture to terminate the polymerization. The obtained solution was taken out and condensed under reduced pressure. The condensed solution was poured into methanol (5 L) to separate the component that was insoluble in the methanol. As a result, the styrene-butadiene copolymer in which the terminal was modified with an alkoxysilane (alkoxysilane terminal-modified SBR) (827 g; Mn=350000; Mw=490000; PDI=1.4) was obtained, and the yield was 81%. Note that, as a result of determination by IR spectroscopy, it was estimated that vinyl/trans/cis=4/61/35. Furthermore, the aromatic vinyl content (content of repeating units derived from styrene) was 26 mass %, and the glass transition temperature was −85° C.

Example 8: Copolymer 8 (N-methylpyrrolidone Terminal-Modified SBR)

To a cyclohexane (4.24 kg) solution of a mixture of 1,3-butadiene (721 g, 13330 mmol), styrene (available from Kanto Chemical Co., Inc.; 300 g, 2883 mmol), and 4-tert-butylpyrocatechol (4.79 g, 28.8 mmol), 60 mL of an initiator solution (corresponding to the particular initiator described above) prepared by using n-BuLi (available from Kanto Chemical Co., Inc.; 1.60 mol/L (hexane solution), 18 mL, 28.8 mmol), barium bis(2-ethylhexoxide) (Ba(OCH$_2$CH(C$_2$H$_5$)CH$_2$CH$_2$CH$_2$CH$_3$)$_2$) (available from STREM; 1 M (toluene/hexane solution) 7.5 mL), trioctylaluminum (available from Aldrich; 25 wt % (hexane solution), 45 mL), and cyclohexane (available from Kanto Chemical Co., Inc.; 10 mL) was added and agitated at 60° C. for 24 hours. After the mixture was cooled to room temperature, N-methylpyrrolidone (8.41 g) was added to the mixture to terminate the polymerization. The obtained solution was taken out and condensed under reduced pressure. The condensed solution was poured into methanol (5 L) to separate the component that was insoluble in the methanol. As a result, the styrene-butadiene copolymer in which the terminal was modified with N-methylpyrrolidone (N-methylpyrrolidone terminal-modified SBR) (915 g; Mn=248000; Mw=621000; PDI=2.50) was obtained, and the yield was 90%. Note that, as a result of determination by IR spectroscopy, it was estimated that vinyl/trans/cis=6/40/54. Furthermore, the aromatic vinyl content (content of repeating units derived from styrene) was 24 mass %, and the glass transition temperature was −89° C.

Example 9: Copolymer 9 (SBR)

To a cyclohexane (4.24 kg) solution of a mixture of 1,3-butadiene (721 g, 13330 mmol), styrene (available from Kanto Chemical Co., Inc.; 300 g, 2883 mmol), and 4-tert-butylpyrocatechol (4.79 g, 28.8 mmol), 60 mL of an initiator solution (corresponding to the particular initiator described above) prepared by using n-BuLi (available from Kanto Chemical Co., Inc.; 1.60 mol/L (hexane solution), 18 mL, 28.8 mmol), divinylbenzene (available from Wako Pure Chemical Industries, Ltd.; 1.99 g; 15.3 mmol), barium bis(2-ethylhexoxide) (Ba(OCH$_2$CH(C$_2$H$_5$)CH$_2$CH$_2$CH$_2$CH$_3$)$_2$) (available from STREM; 1 M (toluene/hexane solution) 7.5 mL), trioctylaluminum (available from Aldrich; 25 wt % (hexane solution), 45 mL), and cyclohexane (available from Kanto Chemical Co., Inc.; 10 mL) was added and agitated at 60° C. for 14 hours. After the mixture was cooled to room temperature, methanol (available from Kanto Chemical Co., Inc.; 3.44 g) was added to the mixture to terminate the polymerization. The obtained solution was taken out and condensed under reduced pressure. The condensed solution was poured into methanol (5 L) to separate the component that was insoluble in the methanol. As a result, the styrene-butadiene copolymer (SBR) (806 g; Mn=383000; Mw=574000; PDI=1.8) was obtained, and the yield was 84%. Note that, as a result of determination by IR spectroscopy, it was estimated that vinyl/trans/cis=7/27/66. Furthermore, the aromatic vinyl content (content of repeating units derived from styrene) was 25 mass %, and the glass transition temperature was −87° C.

Comparative Example 1: Comparative Copolymer 1 (SBR)

Tufdene 1000 (SBR), available from Asahi Kasei Corporation.

Note that, as a result of determination by IR spectroscopy, it was estimated that vinyl/trans/cis=13/52/35. Furthermore, the aromatic vinyl content (content of repeating units derived from styrene) was 18 mass %, and the glass transition temperature was −70° C.

Comparative Example 2: Comparative Copolymer 2 (SBR)

NIPOL NS116R (SBR), available from Zeon Corporation.

Note that, as a result of determination by IR spectroscopy, it was estimated that vinyl/trans/cis=63/28/9. Furthermore, the aromatic vinyl content (content of repeating units derived from styrene) was 21 mass %, and the glass transition temperature was −35° C.

Comparative Example 3: Comparative Copolymer 3 (SBR)

NIPOL 1502 (SBR), available from Zeon Corporation.

Note that, as a result of determination by IR spectroscopy, it was estimated that vinyl/trans/cis=15/70/15. Furthermore, the aromatic vinyl content (content of repeating units derived from styrene) was 25 mass %, and the glass transition temperature was −54° C.

Comparative Example 4: Comparative Copolymer 4 (SBR)

An initiator solution (corresponding to the particular initiator described above) was prepared by using n-BuLi (available from Kanto Chemical Co., Inc.; 1.55 mol/L (hexane solution), 3.3 mL, 5.12 mmol), barium bis(2-ethylhexoxide) ($Ba(OCH_2CH(C_2H_5)CH_2CH_2CH_2CH_3)_2$) (available from STREM; 1 M (toluene/hexane solution) 1.5 mL), trioctylaluminum (available from Aldrich; 25 wt % (hexane solution), 9 mL), and cyclohexane (available from Kanto Chemical Co., Inc.; 7 mL). This initiator solution was heated to 60° C., and a mixture of 1,3-butadiene (available from Aldrich; 15 wt % (hexane solution); 30.6 g; 84.9 mmol) and styrene (available from Kanto Chemical Co., Inc.; 3.99 g; 38.3 mmol) was added thereto and agitated at 60° C. for 4 hours. After the mixture was cooled to room temperature, methanol (available from Kanto Chemical Co., Inc.; 5 mL) was added to the mixture to terminate the polymerization. The obtained solution was taken out and condensed under reduced pressure. The condensed solution was poured into methanol (400 mL) to separate the component that was insoluble in the methanol. As a result, the styrene-butadiene copolymer (SBR) (5.49 g; Mn=6510; Mw=7590; PDI=1.2) was obtained, and the yield was 64%. Note that, as a result of determination by IR spectroscopy, it was estimated that vinyl/trans/cis=6/83/11. Furthermore, the aromatic vinyl content (content of repeating units derived from styrene) was 42 mass %, and the glass transition temperature was −68° C.

For Comparative copolymer 4, $^1$H-NMR (CDCl$_3$, 20° C.): δ=7.3-6.4 (br), 5.5-4.7 (br), 3.8-3.6 (br), 2.5-0.7 (br).

Note that "(br)" indicates that the peak is broad.

Comparative Example 5: Comparative Copolymer 5 (SBR)

Tufdene 1834 (SBR), available from Asahi Kasei Corporation.

Note that, as a result of determination by IR spectroscopy, it was estimated that vinyl/trans/cis=10/57/33. Furthermore, the aromatic vinyl content (content of repeating units derived from styrene) was 19 mass %, and the glass transition temperature was −72° C.

Comparative Example 6: Comparative Copolymer 6 (SBR)

To a cyclohexane (4.24 kg) solution of a mixture of 1,3-butadiene (878 g, 16228 mmol), styrene (available from Kanto Chemical Co., Inc.; 200 g, 1922 mmol), and 4-tert-butylpyrocatechol (3.19 g, 19.2 mmol), 60 mL of an initiator solution (corresponding to the particular initiator described above) prepared by using n-BuLi (available from Kanto Chemical Co., Inc.; 1.60 mol/L (hexane solution), 18 mL, 28.8 mmol), barium bis(2-ethylhexoxide) ($Ba(OCH_2CH(C_2H_5)CH_2CH_2CH_2CH_3)_2$) (available from STREM; 1 M (toluene/hexane solution) 7.5 mL), trioctylaluminum (available from Aldrich; 25 wt % (hexane solution), 45 mL), and cyclohexane (available from Kanto Chemical Co., Inc.; 10 mL) was added and agitated at 60° C. for 14 hours. After the mixture was cooled to room temperature, methanol (available from Kanto Chemical Co., Inc.; 3.44 g) was added to the mixture to terminate the polymerization. The obtained solution was taken out and condensed under reduced pressure. The condensed solution was poured into methanol (5 L) to separate the component that was insoluble in the methanol. As a result, the styrene-butadiene copolymer (SBR) (949 g; Mn=409000; Mw=912000; PDI=2.23) was obtained, and the yield was 88%. Note that, as a result of determination by IR spectroscopy, it was estimated that vinyl/trans/cis=7/31/62. Furthermore, the aromatic vinyl content (content of repeating units derived from styrene) was 12 mass %, and the glass transition temperature was −94° C.

Preparation of Rubber Composition

The components shown in Table 1 below were compounded in the proportions (part by mass) shown in Table 1 below.

Specifically, the components shown in Table 1 below except for the sulfur and the vulcanization accelerator were first mixed in a Bunbury mixer at 150° C. for 2 minutes. Thereafter, a roll was used to mix the sulfur and the vulcanization accelerator to obtain a rubber composition.

TABLE 1

| | |
|---|---|
| Copolymer | 100 |
| Oil | 37.5 |
| Carbon black | 5 |
| Silica | 80 |
| Zinc oxide | 3 |
| Vulcanization activator | 2 |
| Processing aid | 1 |
| Anti-aging agent | 1.5 |
| Silane coupling agent | 6.4 |
| Vulcanization accelerator 1 | 1.7 |
| Sulfur | 1.5 |
| Vulcanization accelerator 2 | 2 |

The details of each component shown in Table 1 above are as follows.

Copolymer: each of aromatic vinyl-diene copolymers of Examples and Comparative Examples Oil: Extract No. 4 S (available from Showa Shell Sekiyu K.K.)

Carbon black: Show Black N339 (available from Cabot Japan K.K.)

Silica: ZEOSIL 165GR (available from Rhodia)

Zinc oxide: Zinc Oxide III (available from Seido Chemical Industry Co., Ltd.)

Vulcanization activator: Stearic acid YR (available from BF Goodrich)

Processing aid: Aktiplast ST (available from Rhein Chemie)

Anti-aging agent: Santoflex 6PPD (available from Solutia Europe)

Silane coupling agent: Si69 (available from Degussa)

Vulcanization accelerator 1: NOCCELER CZ-G (available from Ouchi Shinko Chemical Industrial Co., Ltd.)

Sulfur: sulfur (available from Karuizawa Refinery Ltd.)

Vulcanization accelerator 2: Soxinol D-G (available from Sumitomo Chemical Co., Ltd.)

Preparation of Vulcanized Rubber Sheet

A vulcanized rubber sheet was prepared by press-vulcanizing each of the obtained (unvulcanized) rubber compositions for 15 minutes at 160° C. in a mold (15 cm×15 cm×0.2 cm).

Evaluation

The following evaluations were performed for the obtained vulcanized rubber sheets.

Hardness

For the vulcanized rubber sheet produced as described above, hardness (type A durometer hardness) at 60° C. was evaluated in accordance with JIS K6253-3. The results are shown in Table 2 (hardness). The results are expressed as index values with the index value of Comparative Example 1 being assigned the value of 100. A greater index value indicates a higher hardness and superior mechanical properties of a formed tire.

Strength at Break

For the vulcanized rubber sheet produced as described above, a dumbbell-shaped JIS No. 3 test piece (thickness: 2 mm) was punched out, and the strength at break (stress at break) was evaluated in the condition at a temperature of 20° C. and a tensile test speed of 500 mm/min, in accordance with JIS K6251:2010, The results are shown in Table 2 (TB). The results are expressed as index values with the strength at break of Comparative Example 1 being assigned the index value of 100. A larger index value indicates a higher strength at break and superior mechanical properties of a formed tire.

Wear Resistance

For the vulcanized rubber sheet produced as described above, the amount of wear was measured by a Field Performance Simulation (FPS) abrasion tester at a temperature of 20° C. and at a slip ratio of 10%. Then, the wear resistance index was calculated from the expression below by assigning the amount of wear of Comparative Example 1 the value of 100. The results are shown in Table 2 (wear resistance). A greater index value indicates a superior wear resistance of a formed tire.

Wear resistance index value=(amount of wear of Comparative Example 1/amount of wear of sample)×100

TABLE 2

| | | Particular initiator | Monomer | | | Electrophile | |
| --- | --- | --- | --- | --- | --- | --- | --- |
| | | | 1,3-Butadiene [mmol] | Styrene [mmol] | Phenol compound [mmol] | Modifying agent | Aromatic vinyl content [Mass %] |
| Example 1 | Copolymer 1 | Particular 1 | 12867 | 2883 | 28.8 | Methanol | 31 |
| Example 2 | Copolymer 2 | Particular 2 | 13098 | 2883 | 28.8 | Methanol | 26 |
| Example 3 | Copolymer 3 | Particular 1 | 13098 | 2883 | 28.8 | Methanol | 31 |
| Example 4 | Copolymer 4 | Particular 1 | 13098 | 2883 | 28.8 | Cyclic silazane | 29 |
| Example 5 | Copolymer 5 | Particular 1 | 13098 | 2883 | 28.8 | Titanium halide | 31 |
| Example 6 | Copolymer 6 | Particular 1 | 13098 | 2883 | 28.8 | Tin halide | 28 |
| Example 7 | Copolymer 7 | Particular 1 | 13330 | 2883 | 28.8 | Alkoxysilane | 26 |
| Example 8 | Copolymer 8 | Particular 1 | 13330 | 2883 | 28.8 | NMP | 24 |
| Example 9 | Copolymer 9 | Particular 2 | 13330 | 2883 | 28.8 | Methanol | 25 |
| Comparative Example 1 | Comparative Copolymer 1 | | | | | | 18 |
| Comparative Example 2 | Comparative Copolymer 2 | | | | | | 21 |
| Comparative Example 3 | Comparative Copolymer 3 | | | | | | 25 |
| Comparative Example 4 | Comparative Copolymer 4 | Particular 1 | 84.9 | 38.3 | 0 | Methanol | 42 |
| Comparative Example 5 | Comparative Copolymer 5 | | | | | | 19 |
| Comparative Example 6 | Comparative Copolymer 6 | Particular 1 | 16228 | 1922 | 19.2 | Methanol | 12 |

| | Microstructure [mol %] | | | | Molecular weight | | Evaluation result | | |
| --- | --- | --- | --- | --- | --- | --- | --- | --- | --- |
| | vinyl structure | 1,4- Trans structure | 1,4- Cis structure | Tg [° C.] | Mn | Mw | Hardness | TB | Wear resistance |
| Example 1 | 3 | 61 | 36 | −84 | 166,600 | 295,000 | 102 | 110 | 104 |
| Example 2 | 4 | 61 | 35 | −84.5 | 350,000 | 490,000 | 105 | 114 | 110 |
| Example 3 | 3 | 62 | 35 | −84 | 360,000 | 500,000 | 100 | 111 | 105 |
| Example 4 | 4 | 65 | 31 | −85 | 418,000 | 668,000 | 101 | 126 | 136 |
| Example 5 | 2 | 47 | 51 | −85 | 244,000 | 610,000 | 101 | 102 | 108 |
| Example 6 | 4 | 58 | 38 | −84 | 227,000 | 658,000 | 99 | 97 | 107 |
| Example 7 | 4 | 61 | 35 | −85 | 350,000 | 490,000 | 98 | 112 | 112 |
| Example 8 | 6 | 40 | 54 | −89 | 248,000 | 621,000 | 96 | 115 | 107 |
| Example 9 | 7 | 27 | 66 | −87 | 383,000 | 574,000 | 97 | 114 | 118 |
| Comparative Example 1 | 13 | 52 | 35 | −70 | 92,100 | 239,000 | 100 | 100 | 100 |
| Comparative Example 2 | 63 | 28 | 9 | −35 | 101,000 | 222,000 | 96 | 83 | 60 |
| Comparative Example 3 | 15 | 70 | 15 | −54 | 86,700 | 321,000 | 94 | 94 | 89 |

TABLE 2-continued

| | | | | | | | | |
|---|---|---|---|---|---|---|---|---|
| Comparative Example 4 | 6 | 83 | 11 | −68 | 6,510 | 7,590 | | | |
| Comparative Example 5 | 10 | 57 | 33 | −72 | 161,000 | 386,000 | 100 | 107 | 95 |
| Comparative Example 6 | 7 | 31 | 62 | −94 | 409,000 | 912,000 | 98 | 105 | 100 |

The "particular initiator" in Table 2 indicates the type of the particular initiator used in the production of the aromatic vinyl-diene copolymer of each of Examples and Comparative Examples, and is as follows.
 Particular 1: initiator prepared by using an organolithium compound, an alkyl aluminum, and a metal alcoholate
 Particular 2: initiator prepared by using an organolithium compound, an alkyl aluminum, a metal alcoholate, and an aromatic divinyl The "monomer" in Table 2 indicates the amount [mmol] of the monomer used in the production of the aromatic vinyl-diene copolymer of each of Examples and Comparative Examples.

The "phenol compound" in Table 2 indicates the amount [mmol] of the phenol compound (4-tert-butylpyrocatechol) used in the production of the aromatic vinyl-diene copolymer of each of Examples and Comparative Examples.

In Table 2 above, the column of "electrophile (modifying agent)" indicates the electrophile (modifying agent) used in each of Examples and Comparative Examples. The details of the electrophiles (modifying agents) are as follows.
 Methanol: methanol
 Cyclic silazane: N-trimethylsilyl-1,1-dimethoxy-2-azasilacyclopentane (the following structure)

[Chemical Formula 4]

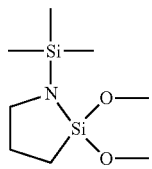

Titanium halide: titanium tetrachloride
Tin halide: tin chloride
Alkoxysilane: N,N-bistrimethylsilyl-3-aminopropyltrimethoxysilane (the following structure; Me represents a methyl group)

[Chemical Formula 5]

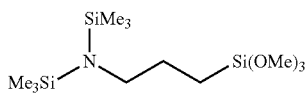

NMP: N-methylpyrrolidone (the compound represented by formula (N) above)

The "aromatic vinyl content" in Table 2 indicates the content (mass %) of the repeating units derived from the aromatic vinyl in the aromatic vinyl-diene copolymer of each of Examples and Comparative Examples, and specifically is the content (mass %) of the repeating units derived from styrene.

The "microstructure" in Table 2 indicates the proportion (mol %) occupied by each of the microstructures (vinyl structure, 1,4-trans structure, 1,4-cis structure) among the repeating units derived from the diene in the aromatic vinyl-diene copolymer of each of Examples and Comparative Examples.

The "Tg" in Table 2 is the glass transition temperature [° C.] of the aromatic vinyl-diene copolymer of each of Examples and Comparative Examples.

The "molecular weight" in Table 2 is the molecular weight (Mn, Mw) of the aromatic vinyl-diene copolymer of each of Examples and Comparative Examples. The measurement method of the molecular weight is as described above.

As is clear from Table 2, Examples 1 to 9 (copolymers 1 to 9), in which the aromatic vinyl content, the proportion of each of the microstructures, and the glass transition temperature are in the particular ranges exhibited excellent mechanical properties and wear resistance when tires were formed.

From the comparison of Examples 1 to 3 and 9, Example 9 in which the proportion of the 1,4-cis structure was 40 mol % or greater among the repeating units derived from the diene exhibited superior wear resistance when a tire is formed.

Furthermore, from the comparison of Examples 1 to 3, Example 2 in which the initiator was prepared by using the organolithium compound, the alkyl aluminum, the metal alcoholate, and the aromatic divinyl exhibited superior mechanical properties and wear resistance.

Furthermore, from the comparison of Examples 1 and 3 to 8 (comparison of embodiments in which the particular initiator used in the production of the aromatic vinyl-diene copolymer was an initiator prepared by using the organolithium compound, the alkyl aluminum, the metal alcoholate, and the aromatic divinyl), Examples 4 to 8 each having a terminal modified with a particular modifying agent exhibited superior wear resistance.

On the other hand, Comparative Examples 1 to 6 (comparative copolymers 1 to 6) in which at least one of the aromatic vinyl content, the proportion of each of the microstructures, and the glass transition temperature was not in the particular range exhibited at least one of insufficient mechanical properties and insufficient wear resistance.

REFERENCE NUMERALS

1 Bead portion
2 Sidewall portion
3 Tire tread portion
4 Carcass layer
5 Bead core
6 Bead filler
7 Belt layer
8 Rim cushion

The invention claimed is:
1. An aromatic vinyl-diene copolymer which is a copolymer of an aromatic vinyl and a diene, wherein
 a content of a repeating unit derived from an aromatic vinyl is 18 mass % or greater,
 among repeating units derived from a diene, a proportion of a vinyl structure is 8 mol % or less, a proportion of a 1,4-trans structure is 60 mol % or less, and a proportion of a 1,4-cis structure is from 17 to 90 mol %,
 a glass transition temperature is −60° C. or lower, and a terminal is modified with at least one type of modifying agent selected from the group consisting of titanium halides, tin halides, cyclic silazanes, alkoxysilanes, epoxides, amines, ketones, and compounds represented by formula (N) below:

wherein, $R^1$ represents a hydrogen atom or an alkyl group, and $R^2$ represents an alkylene group.

2. The aromatic vinyl-diene copolymer according to claim 1, wherein the proportion of the 1,4-cis structure is 30 to 90 mol %.

3. The method for producing an aromatic vinyl-diene copolymer, wherein the aromatic vinyl-diene copolymer described in claim 1 is produced by
copolymerizing an aromatic vinyl and a monomer having a diene by using an initiator prepared by using an organolithium compound, an alkyl aluminum, and a metal alcoholate, and then
terminating the polymerization by using an electrophile selected from the group consisting of titanium halides, tin halides, cyclic silazanes, alkoxysilanes, epoxides, amines, ketones, and compounds represented by formula (N) below:

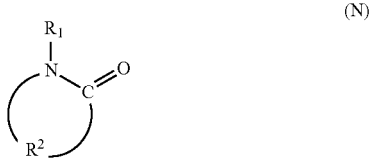

wherein, $R^1$ represents a hydrogen atom or an alkyl group, and $R^2$ represents an alkylene group.

4. A rubber composition comprising the aromatic vinyl-diene copolymer described in claim 1.

5. The method for producing an aromatic vinyl-diene copolymer, wherein the aromatic vinyl-diene copolymer described in claim 2 is produced by
copolymerizing an aromatic vinyl and a monomer having a diene by using an initiator prepared by using an organolithium compound, an alkyl aluminum, and a metal alcoholate, and then
terminating the polymerization by using an electrophile selected from the group consisting of titanium halides, tin halides, cyclic silazanes, alkoxysilanes, epoxides, amines, ketones, and compounds represented by formula (N) below:

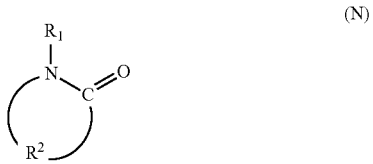

wherein, $R^1$ represents a hydrogen atom or an alkyl group, and $R^2$ represents an alkylene group.

6. The method for producing an aromatic vinyl-diene copolymer according to claim 3, wherein a phenol compound is added to a copolymer system during the copolymerization of the monomer.

7. The method for producing an aromatic vinyl-diene copolymer according to claim 5, wherein a phenol compound is added to a copolymer system during the copolymerization of the monomer.

8. A rubber composition comprising the aromatic vinyl-diene copolymer described in claim 2.

9. The aromatic vinyl-diene copolymer according to claim 1, wherein the terminal is modified with at least one type of modifying agent selected from the group consisting of titanium halides, cyclic silazanes, and compounds represented by formula (N) below:

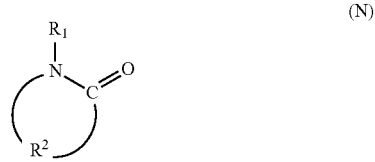

wherein, $R^1$ represents a hydrogen atom or an alkyl group, and $R^2$ represents an alkylene group.

10. The aromatic vinyl-diene copolymer according to claim 1, wherein the terminal is modified with at least one type of modifying agent selected from the group consisting of titanium halides, tin halides, and cyclic silazanes.

11. The aromatic vinyl-diene copolymer according to claim 1, wherein the proportion of the 1,4-cis structure is from 40 to 90 mol %.

12. An aromatic vinyl-diene copolymer which is a copolymer of an aromatic vinyl and a diene, wherein
a content of a repeating unit derived from an aromatic vinyl is 18 mass % or greater,
among repeating units derived from a diene, a proportion of a vinyl structure is 8 mol % or less, a proportion of a 1,4-trans structure is 75 mol % or less, and a proportion of a 1,4-cis structure is from 40 to 90 mol %,
a glass transition temperature is −60° C. or lower, and
a terminal is modified with at least one type of modifying agent selected from the group consisting of titanium halides, tin halides, cyclic silazanes, alkoxysilanes, epoxides, amines, ketones, and compounds represented by formula (N) below:

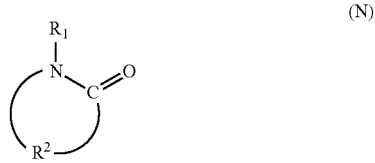

wherein, $R^1$ represents a hydrogen atom or an alkyl group, and $R^2$ represents an alkylene group.

13. The method for producing an aromatic vinyl-diene copolymer, wherein the aromatic vinyl-diene copolymer described in claim 12 is produced by
copolymerizing an aromatic vinyl and a monomer having a diene by using an initiator prepared by using an organolithium compound, an alkyl aluminum, and a metal alcoholate, and then
terminating the polymerization by using an electrophile selected from the group consisting of titanium halides, tin halides, cyclic silazanes, alkoxysilanes, epoxides, amines, ketones, and compounds represented by formula (N) below:

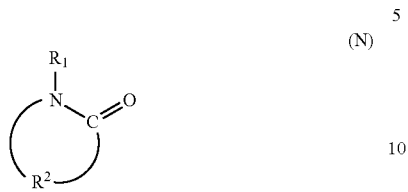

wherein, $R^1$ represents a hydrogen atom or an alkyl group, and $R^2$ represents an alkylene group.

14. The aromatic vinyl-diene copolymer according to claim 1, wherein
the content of the repeating unit derived from the aromatic vinyl is 30 mass % or greater, and
among repeating units derived from the diene, the proportion of the vinyl structure is 4 mol % or less, the proportion of the 1,4-trans structure is 30 to 60 mol %, and the proportion of the 1,4-cis structure is from 40 to 70 mol %.

* * * * *